United States Patent [19]
Hosoya

[11] Patent Number: 4,870,309
[45] Date of Patent: Sep. 26, 1989

[54] WIRING DEVICE IN DIRECT CURRENT MACHINE
[75] Inventor: Yukiteru Hosoya, Sakai, Japan
[73] Assignee: Mitsuba Electric Manufacturing Co., Ltd., Gunma, Japan
[21] Appl. No.: 200,749
[22] Filed: May 31, 1988
[30] Foreign Application Priority Data
  Jun. 10, 1987 [JP] Japan .................. 62-89508[U]
[51] Int. Cl.$^4$ .................. H02K 5/08; H01R 11/00; H01R 39/36
[52] U.S. Cl. .................. 310/71; 310/91; 310/239
[58] Field of Search .................. 310/43, 71, 239, 242, 310/249, 91

[56] References Cited
U.S. PATENT DOCUMENTS

| | | | |
|---|---|---|---|
| 3,127,533 | 3/1964 | Gardiner, Jr. | 310/239 |
| 3,182,218 | 5/1965 | Videtic | 310/239 |
| 3,617,786 | 5/1970 | Stielper | 310/242 |
| 4,004,169 | 1/1977 | Charlton | 310/71 |
| 4,206,959 | 6/1980 | de Vries | 310/71 |
| 4,727,274 | 2/1988 | Adam et al. | 310/239 |

FOREIGN PATENT DOCUMENTS 170253  2/1987  Japan .................. 310/71

Primary Examiner—Peter S. Wong
Assistant Examiner—D. L. Rebsch
Attorney, Agent, or Firm—Rodman & Rodman

[57] ABSTRACT

The wiring device in a direct current machine, includes a pigtail of a brush and a lead wire bound by a button contactor. The button contactor is formed into a generally T shape and is located at the forward end portion of the lead wire. The button contactor is received and held in a holding recess formed on a base made of resin. The holding recess is provided with an insertion recess defined by a pair of spaced and parallel side walls, for receiving the binding portion of the button contactor engageable recesses are respectively provided at corresponding opposite end portions of both side walls, and open toward each other and toward the brush. The engageable recesses receive opposite end portions of a head of the button contactor. A regulating portion is formed at an extension of the insertion recess opposite to an end face of the head of the button contactor. The lead wire includes a first flexed portion engaged with and flexed at one of the side wall end portions and a second flexed portion engaged with and flexed at wall portions erected from the base, at a position closer to a lead wire outlet than the first flexed portion. Thus the lead wire is flexed into a generally S shape for being guided.

3 Claims, 2 Drawing Sheets

WIRING DEVICE IN DIRECT CURRENT MACHINE

BACKGROUND OF THE INVENTION

1. Field of the Invention

This invention relates to a wiring device in a direct current (dc) machine, particularly to a construction of connection and wiring between a pigtail of a brush and a lead wire electrically connected thereto, and is concerned with a wiring device effective in use for connection and wiring between a pigtail and a lead wire in a dc motor, for example.

2. Related Art Statement

The following constructions may be adopted for electrically connecting a pigtail to a lead wire and providing a wiring therebetween in a dc motor.

The first type of construction is of such an arrangement that the pigtail and the lead wire are clamped by a terminal member which is fixed to a base.

The second type of construction is of such an arrangement that the pigtail and the lead wire are surrounded, clamped and bound by a sheet-shaped lug portion of a terminal of an electrically conductive material, and the terminal is fixed to a base by coupling a foot portion of the terminal into a recess formed in the base.

However, the above-described constructions present the following disadvantages.

In the first construction, it is necessary to press and bend the terminal member fixed to the base for clamping the pig tail and the lead wire, so that assembly is difficult.

In the second wiring construction, if the lead wire is biased by an external force, then the terminal with the lead wire can easily fall away from the recess.

An object of the present invention is to provide a wiring device in a dc machine, that facilitates assembly and repair.

The wiring device in a dc machine according to the present invention includes features wherein a pigtail of a brush and a lead wire are bound by a button contactor formed into a generally T letter shape, and this button contactor is received and held in a holding recess formed in a base made of resin.

With the wiring device in a dc machine according to the present invention, a free end portion of the pigtail and a free end portion of a wiring are clamped and bound by the button contactor and this bound portion should be coupled into the holding recess formed in the base, so that assembly is facilitated. Furthermore, the bound portion is also held by the holding recess, so that, even if the lead wire is biased by the external force, the lead wire will not fall off.

BRIEF DESCRIPTION OF THE DRAWINGS

The above and other objects and features of the present invention will become more apparent when referred to the following descriptions given in conjunction with the accompanying drawings, wherein like reference numerals denote like elements, and in which.

DETAILED DESCRIPTION OF THE PREFERRED EMBODIMENT

Figure 1:
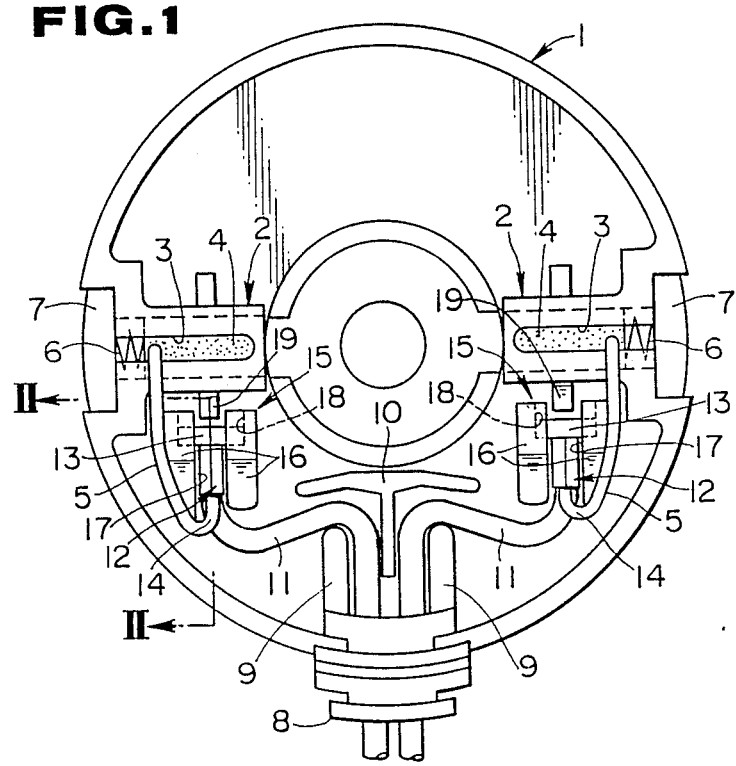
FIG. 1 is a plan view showing one embodiment of the wiring device in a dc machine according to the present invention.

Referring to the drawings, a wiring device in a dc machine in this embodiment is of such an arrangement that a pigtail 5 of a brush and a lead wire electrically connected thereto are fixedly wired on a base 1 of a dc motor. The base 1 is integrally formed into a generally disk shape by use of resin having electric insulating quality, and fixed at a position opposed to a commutator, not shown, of the motor. On one end face (hereinafter referred to as the 'top surface') of the base 1, there are provided a pair of brush boxes 2, each formed into a generally tubular shape, being a regular square cross-section in a manner to be integrally formed on the base 1, and in bisymmetrical arrangement with a phase difference of 180° therebetween (hereinafter, because of the bisymmetricality, only one side is typically explained). An elongated pigtail insertion hole 3 is formed in the brush box 2 in the radial direction thereof. A brush 4 implanted therein with the pigtail 5 is slidably inserted into the brush box 2, and the pigtail 5 is inserted through the pigtail insertion hole 3. In the brush box 2, a brush spring 6 is received behind the brush 4, and a cap 7 is capped to the rear end portion of the brush box 2 in a manner to block an opening. Accordingly, the brush 4 can be biased inwardly in the radial direction thereof by the brush spring 6, reaction force of which is received by the cap 7.

Coupled into the base 1 at a position spaced about 90° apart from the brush boxes 2 is a rubber grommet 8, at the inside of which a pair of side walls 9 and a T-shaped wall 10 are protrudingly provided bisymmetrically. Inserted through the rubber grommet 8 are a pair of lead wires 11, and an inserted end portion of the lead wire 11 and a free end portion of the pigtail 5 are bound through a button contactor 12 so as to be mechanically and electrically connected to each other.

Figure 4:
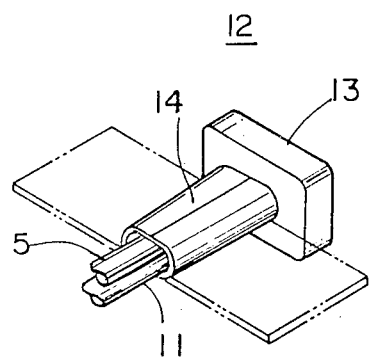
FIG. 4 is a perspective view showing the button contactor.

More specifically, as shown in FIG. 4, the button contactor 12 includes a so-called button-shaped head 13 and a binding portion 14 integrally, provided thereon, and, in the binding portion 14 in an unfolded state thereof (refer to the hypothetical line), the pigtail 5 and the lead wire 11 are disposed and wrapped, and thereafter bound by clamping.

Furthermore, a pair of holding recesses 15 are formed integrally on the base 1 near both of the brush boxes 2 on the side of the grommet 8. Each of the holding recesses is provided with a pair of side walls 16. The side walls 16 and 16 integrally protrude near the brush boxes 2 parallel to lines perpendicularly intersecting the center lines of the brush boxes 2. A space defined between the side walls 16 and 16 is set to receive the binding portion 14, whereby an insertion recess 17, being open at the top surface, and front and rear surfaces in the radial direction thereof, is substantially defined. In the side walls 16, engageable recesses 18 are provided at corner positions opposed to each other. These recesses 18 open toward each other and toward the brush box 2. The engageable recesses 18 are set to be engageable with opposite end portions of the head 13 of the button contactor 12. Furthermore, a regulating portion 19 integrally protrude near the side walls 16 on the side of the brush box 2 in a manner to be close to the opening of the insertion recess 17 on an extension of the insertion recess 17, and the regulating portion 19 is opposed to the end face of the head 13 of the button contactor 12. The regulating portion 19 is inclined so as to progressively approach the head as the surface thereof opposed to the head goes down.

Figure 2:
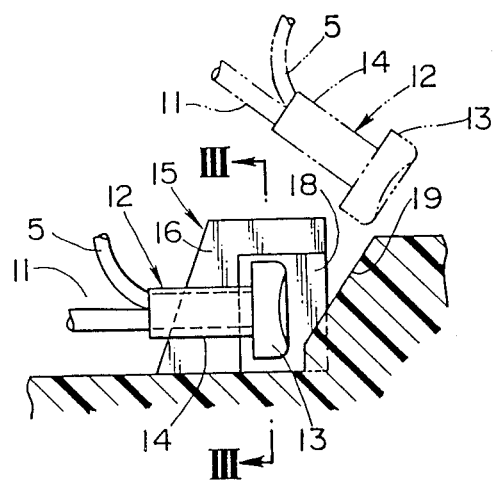
FIG. 2 is an enlarged partial side sectional view taken along the line II—II in FIG. 1.
Figure 3:
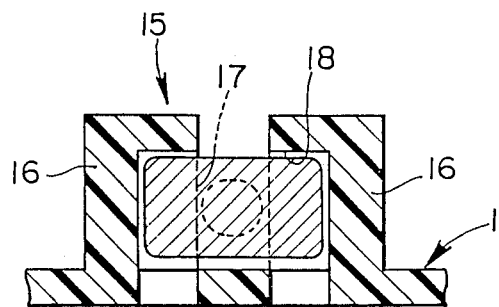
FIG. 3 is an enlarged partial front sectional view taken along the line III—III in FIG. 2.

The button contactor 12 binding the pigtail 5 and the lead wire 11 is mounted in the holding recess 15 constructed as above. More specifically, as indicated by hypothetical lines in FIG. 2, the button contactor 12 is inserted in a manner to go along the inclined surface of the regulating portion 19 into a space formed between the side walls 16 and the regulating portion 19 from above, and the binding portion 14 is inserted into the insertion recess 17 from above. Subsequently, when the button contactor 12 is slightly pulled rearward, the opposite end portions of the head 13 are coupled in and engaged with the engageable recesses 18, respectively, so that the button contactor 12 is regulated in the upward movement thereof. In this state, the end face of the head 13 is opposed by the regulating portion 19 to be regulated in the forward movement, so that the button contactor 12 is held in a state of being prevented from falling off.

The lead wire 11 connected to the button contactor 12 held in the holding recess 15 is wired in a S letter shape as shown in FIG. 1, so that the lead wire 11 is regulated in its movement. More specifically, the lead wire 11 is flexed to be engaged with the end portion of the inner side wall 16 at the base end portion of the binding portion 14 of the button contactor 12, and coupled into a space defined between a side wall 9 protrudingly provided at a position adjacent the grommet 8 and the T-shaped wall 10.

As described above, the lead wire 11 is wired in the S letter shape between the holding recess 15 and the grommet 8, whereby, even when the lead wire 11 is biased by an intensive draw-out force or a pull-in force, the external force does not act on the button contactor 12, so that loose movement of the button contactor 12 in the holding recess 15 can be avoided.

Incidentally, the present invention need not necessarily be limited to the above embodiment, and needless to say that the present invention may be variously modified within a scope of not departing from the gist.

For example, the lead wire need not necessarily be wired in the S-shape.

As has been described hereinabove, according to the present invention, the pigtail and the lead wire, which are in the free state, are connected to each other through the clamping of the button contactor and this binding portion can be mounted and fixed into the holding recess, so that the assembly can be facilitated and the resistance to the external force acting on the lead wire can be increased.

What is claimed is:

1. A wiring device for a direct current (dc) machine having a commutator brush with a pigtail and a lead wire having a forward end portion, comprising,
    a generally T-shaped button contactor having a head portion with opposite ends, said head portion having an end face, said button contactor further including a binding portion of binding said pigtail and said lead wire at the forward end portion of said lead wire, a base made of resin having a molding recess for receiving and holding said button contactor, a pair of spaced and parallel side walls on said base at said holding recess to define an insertion recess for receiving the binding portion of said button contactor, said side walls having first corresponding opposite end portions, engageable recesses respectively formed at said first corresponding opposite end portions of said side walls, said first corresponding end portions defining an extension of said insertion recess, and a regulating portion formed at said holding recess at the extension portion of said insertion recess and opposite the end face of the head portion of said button contactor.

2. The wiring device in a dc machine as set forth in claim 1 wherein said holding recess has a bottom and said regulating portion includes a surface opposed to said head portion of said button contactor and inclined to the bottom of said holding recess so as to progressively approach the head portion of said button contactor as the surface inclines toward the bottom of said holding recess.

3. The wiring device in a dc machine as set forth in claim 1 including a lead wire outlet and wherein said lead wire includes a first flexed portion engaged with and flexed at one of said side walls at one of said first corresponding end portions and a second flexed portion at a position closer to the lead wire outlet than said first flexed portion, outlet wall portions formed on said base proximate the lead wire outlet such that the lead wire is engaged with and flexed at one of said outlet wall portions, whereby said lead wire is flexed into a generally S shape for being guided.

* * * * *

UNITED STATES PATENT AND TRADEMARK OFFICE
CERTIFICATE OF CORRECTION

PATENT NO. : 4,870,309
DATED : September 26, 1989
INVENTOR(S) : Yukiteru HOSOYA

It is certified that error appears in the above-identified patent and that said Letters Patent is hereby corrected as shown below:

In the Abstract, line 9, after "contactor" insert --.--; line 10, change "engageable" to --Engageable--.

At column 2, line 30, after "6," insert --a--.

At column 2, line 32, change "into" to --onto--.

At column 2, line 65, change "protrude" to --protrudes--.

At column 4, line 12, change "of" to --for--.

At column 4, line 22, after "walls," insert --said engageable recesses being opened toward each other and toward said brush for engagingly receiving the opposite ends of the head portion of said button contactor,--.

Signed and Sealed this

Eleventh Day of September, 1990

Attest:

HARRY F. MANBECK, JR.

*Attesting Officer*  *Commissioner of Patents and Trademarks*